United States Patent [19]

Lempa, Jr.

[11] 4,246,854
[45] Jan. 27, 1981

[54] FERTILIZER INJECTOR TOOL

[76] Inventor: Bernard J. Lempa, Jr., 8422 Carvel La., Houston, Tex. 77036

[21] Appl. No.: 4,047

[22] Filed: Jan. 17, 1979

[51] Int. Cl.³ .............................................. A01C 5/02
[52] U.S. Cl. ..................................................... 111/96
[58] Field of Search ................................. 111/7.2, 96

[56] References Cited

U.S. PATENT DOCUMENTS

| | | | |
|---|---|---|---|
| 14,003 | 12/1855 | Stickney | 111/96 |
| 19,540 | 3/1858 | Batcheller | 111/96 |
| 295,762 | 3/1884 | Hoag | 111/96 |
| 812,616 | 2/1906 | Thoeni | 111/7.2 |
| 2,170,598 | 8/1939 | Sims | 111/96 |
| 3,170,422 | 2/1965 | Gregory | 111/96 |
| 3,771,474 | 11/1973 | Elston | 111/96 |

*Primary Examiner*—Robert E. Bagwill
*Attorney, Agent, or Firm*—Bill B. Berryhill

[57] ABSTRACT

A fertilizer injector comprising in combination a fertilizer storage hopper having an offset bottom portion, an elongated tubular centralizer offset from the hopper and in axial alignment with the bottom portion, an injector-rod mounted in the tubular centralizer and bottom portion, whereby downward movement of the injector rod forms a hole of selected depth in the surface of the soil and upward movement of the injector rod allows a selected quantity of granular fertilizer to fill the hole and another downward movement closes off an outlet in the offset bottom portion stopping the flow of fertilizer from the hopper, and a means for locking the injector rod in any desired position. The fertilizer injector also has a filter screen and lid to prevent undesirable material from entering the hopper.

10 Claims, 6 Drawing Figures

U.S. Patent Jan. 27, 1981 4,246,854
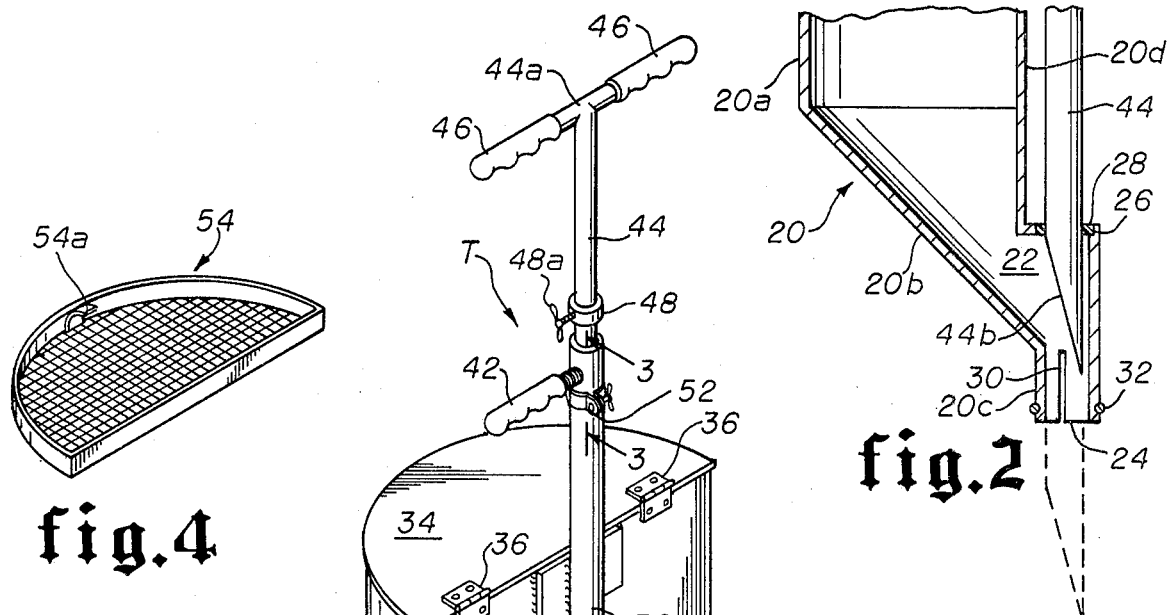

FERTILIZER INJECTOR TOOL

BACKGROUND OF THE INVENTION

The present invention relates to a device for injecting a measured amount of fertilizer beneath the surface of the soil.

It is desirable to place fertilizer beneath the surface of the soil when fertilizing garden plants, trees and shurbs, due to the fact that when placed on the soil surface, rainfall and watering can prematurely wash the fertilizer away. By placing the fertilizer beneath the soil, the root system will absorb the nutrients more quickly and efficiently and the fertilizer will not become weakened as it is filtered from the surface of the soil to the root system.

Tilling the soil is an effective way to distribute the fertilizer properly, but this is a laborious and time consuming task and is not always practical. A thick stand of shrubs, for example, cannot be tilled because the root system might be damaged and because soil at the base of the shrub is inaccessible as a result of the thick foliage.

Several patents have been issued for devices which inject fertilizer beneath the surface of the soil, for example U.S. Pat. No. 3,504,647 to Krarup discloses a fertilizer applicator comprised of a frusto-conical hopper with an aperture at the bottom and center of the hopper and a dibble rod mounted in the center of the hopper and a support rod attached to the cone shaped bottom of the hopper.

Another fertilizer injector is disclosed in U.S. Pat No. 2,370,744 to Molinare. In this patent is also disclosed a frustro-conical hopper with an aperture and injector rod centrally located therein.

A more complex fertilizer injector is disclosed in U.S. Pat. No. 3,014,443 to Keyser et al. This patent also has a funnel shaped hoppeer with an aperture and injector rod centrally located in the hopper.

Another device which could be used for injecting fertilizer is described in U.S. Pat. No. 3,815,526 to Christopherson. In this patent, the hopper is a tubular barrel with an outlet at the bottom and contains a centrally located valve rod.

Although all of these inventions are meritorious, they contain certain deficiencies which the present invention will overcome. For example, the Krarup device (U.S. Pat. No. 3,504,647) discloses two vertically extending rods, a dibble rod and a stationary supporting rod. Both rods are shaped in the form of an inverted "L". This would allow a force to be applied to only one side of each rod, thus the dibble rod would have a tendency to bind in its travel through the guide collars mounted on the support rod when it is manually raised and lowered. Another deficiency is the mounting of the vertical support rod. The support rod is mounted to one side of the axis of the hopper and it is attached to the hopper only at one place on the bottom of the cone shaped portion of the hopper. In this arrangement when the hopper is full of fertilizer and is lifted by the handle of the support rod, which is also off center, the weight of the load would be off balance, tending to rotate counter clockwise about the handle. Thus the user in order to balance the load would have to exert a torque force to overcome the offset center of gravity as well as the force to lift the weight contained in the hopper. A further deficiency in this design is that after repeated use, the material of the hopper would have a tendency to fail at the small area where the support rod is attached to the hopper. Still a further deficiency in the design is that in order to fill the bore hole with fertilizer, the dibble rod handle is pulled up and must overcome a spring force, as the offset support rod is pushed down. In this action an upward force is applied to a guide collar attached to the support rod approximately a third of the way down from the handle of the support rod, and a downward force is applied to the bottom of the support rod where it is attached to the hopper. Since these two forces are not in the same axis, but both act on the support rod, a moment arm is created which tends to cause the bottom of the support rod to rotate about the guide collar. Thus, if there were not sufficient weight in the hopper it would pull laterally away from the bore hole. Also, the hopper is open at the top which would allow leaves, twigs and other foreign material to enter the hopper and impede the gravitational flow of fertilizer.

The Molinare invention (U.S. Pat. No. 2,370,744) is a simple device, but also has certain deficiencies. For example, if the device is to be used by a person in a standing position and if the finger operated latch is close to the handle and at the top of the hopper it becomes necessary to provide a long reciprocating rod. When the hopper is filled, the entire length of the reciprocating rod is in contact with the fertilizer causing a great deal of friction on the rod. The user must overcome a large frictional resistance to move the rod up and down. Another deficiency in the Molinare device is seen when forming a hole in the soil. When the cone shaped valve member is in the up position it is retracted into a cone shaped portion of the chambered body which forms a port or hole. When the device is pressed into the soil, the port or hole in the cone shaped chamber would fill with soil and prevent the cone shaped valve member from projecting outwardly beyond the lower end of the chambered body. A further deficiency is seen when granular material flows from the spout of the tubular portion of the hopper into the measuring chamber. After the measuring chamber has filled with granular material the rod is lifted up causing the valve element to seal off the spout. However, the upward lift would compact the granular material and cause it to be jammed in the down position. A still further deficiency in the Molinare device is that it makes no provision for selectively measuring a quantity of fertilizer.

The Keyser et al U.S. Pat. No. (3,014,443) is a rather complex device having a large number of parts which would make it undesirable for economical manufacture. Inside the square shaped hopper is a disc with an arcuate slot sandwiched between an upper plate having an arcuate slot and a lower plate having an arcuate slot and a series of holes. The fertilizer must pass through these slots and holes to be dispersed. This arrangement could easily become clogged and unworkable if a large lump of fertilizer were to enter and plug one of the slots or holes. Another deficiency in the Keyser device is that in order to vary the amount of fertilizer to be dispersed, it is necessary to change the disc. To do this would require the user to dis-assemble the device.

The Christopherson U.S. Pat. No. (3,815,526) is designed to inject rodent poison underground. However, it could be used to inject fertilizer as well. Several deficiencies are noted in this device also. For example, the hopper consists of an elongated outer barrel, with an elongated rod disposed axially within the barrel. The rod must be moved up and down through the granular material to measure out a certain amount of the material. However, this up and down movement would be difficult due to the friction of the granular material on the length of the rod. Another deficiency in the Christopherson patent is that to fill the device, the top of the barrel is unscrewed and the rod is removed from the barrel. With the bottom open end or port of the barrel held against the ground the barrel is filled with a premeasured amount of granular material. To do this, the user must hold the barrel perfectly straight with one hand while filling it with the other hand. This would be difficult to do if the material used to fill the barrel was in a bag type container. In most instances the user would prop the barrel against a stationary object and use both hands for filling. This means that the granular material would flow out the open bottom end of the barrel. A further deficiency in the Christopherson device is that after the barrel is filled, the rod is inserted into the barrel until the end of the rod closes the open bottom end of the barrel. This means that the rod must push through an elongated section of granular material thusly building up more and more friction the farther it is pushed down into the granular material. Also, there is no provision for guiding the rod on its downward path, other than the side walls of the barrel. Therefore it would be difficult to get the rod into the center of the barrel without several attempts using only one hand. Also, as the rod is pushed down, it would force more granular material out the end of the barrel. Thus a large portion of the granular material would be wasted during the filling operation.

None of the aforementioned patents make provision for filtering out large chunks of the granular fertilizer that form in storage as a result of dampness or high humidity conditions. Nor do any of the patents provide for offsetting the injector rod from the center of the hopper so that the injector rod has to displace a minimum amount of fertilizer as it travels up and down and thereby cutting down on friction on the injector rod.

OBJECTS OF THE INVENTION

The present invention has as one of its objects the provision of a device that injects pelletized fertilizer beneath the surface of the soil.

It is another object of the present invention to provide a device which allows the user to select the quantity of fertilizer to be placed beneath the surface of the soil.

It is another object of the present invention to provide a device which will allow the user to select the depth at which the fertilizer will be placed beneath the surface of the soil.

It is another object of the present invention to provide a device having a means for screening out large chunks of fertilizer and other foreign matter which might hamper the gravitational flow of the fertilizer.

It is a further object of the present invention to provide a device having a closure above the fertilizer hopper to prevent debris from falling into the hopper which might hamper the gravitational flow of fertilizer.

It is a further object of the present invention to provide a device having a foot peg to aid in penetrating the soil and producing downward movement in the injector rod.

It is a further object of the present invention to provide a device which is portable and easily stored.

It is a further object of the present invention to provide a device that eliminates time consuming labor and accomplishes plant fertilization quickly and efficiently.

The objects set forth as well as others will become clear from the following descriptions.

BRIEF DESCRIPTION OF THE DRAWINGS

FIG. 1 is a perspective view of the invention.

FIG. 2 is a partial cross sectional view of a portion of the invention taken along lines 2—2 of FIG. 1 showing the offset outlet arrangement of the hopper.

FIG. 3 is a partial cross sectional view of a portion of the invention taken along lines 3—3 of FIG. 1 showing the lock screw lifting handle arrangement.

FIG. 4 is a perspective view of the screen member contained within the hopper of the invention.

FIG. 5 is a side elevation view of the invention in the hole punching position with a portion of the hopper cut away showing the location of the screen inside the hopper.

FIG. 6 is a side elevation view of the invention with the injector rod in the upward position as the hole is filled with fertilizer.

DETAILED DESCRIPTION OF THE INVENTION

Reference is made to FIGS. 1 and 2, wherein a fertilizer injector tool T, according to the present invention, is illustrated. The fertilizer injector tool T consists of a fertilizer storage hopper 20. Hopper 20 consists of an upper semi-cylindrical section 20a, a mid section 20b which is semi-conical in configuration, and an offset cylindrical bottom section 20c. The hopper 20 has a back wall portion 20d with an opening into the cylindrical bottom section 20c. The cylindrical bottom section 20c has an outlet 24 at its lower end and is enclosed at its upper end except for a hole 26 located on the central axis of the cylinder. Hole 26 has a diameter sufficient to permit insertion of a friction bushing 28 by means of a press fit or other attachment means. Bushing 28 has an internal diameter of sufficient size to permit reciprocating movement of injector rod 44. The cylindrical bottom section 20c contains a number of vertical slots 30. These slots 30 allow the sides of cylindrical section to expand and eliminate a restriction on the injector rod 44 as it pushes in front of itself, and to its sides, a slug of fertilizer downward through the outlet 24. Around the circumference of the cylindrical bottom section 20c is located a spring type clamp 32 which provides sufficient radial pressure to allow an expanding and contracting seal between the inner surfaces of cylindrical section 20c and the outer diameter of injector rod 44. A lid 34 is attached to the backwall 20d of hopper 20 by means of hinges 36 which may be spring loaded. The lid 34 extends slightly beyond the circumference of and covers the top of the semi-cylindrical section 20a of hopper 20. An elongated tubular centralizer 38 is attached to the backwall 20d by means of a bracket 40. The tubular centralizer 38 is laterally offset from the backwall 20d and is in co-axial alignment with the cylindrical bottom section 20c. It is to be noted that the cylindrical bottom section 20c serves as a lower centralizer for the injector rod 44. Near the top of and extending out at an angle of 90° from the tubular centralizer 38 is a lift handle 42. The details of the handle 42 are shown in FIG. 3.

As shown in FIG. 3 one end of lift handle 42 is provided with a pointed end 42a and threads 42b. It should be understood that by rotating the handle 42 the pointed end 42 will contact the outer surface of the injector rod 44 and lock it in any desired position in relation to the hopper 20.

Referring now to FIGS. 1 and 2, an injector rod 44 passes through the tubular centralizer 38 and the cylindrical lower section 20c. Injector rod 44 has a T-shaped handle section 44a provided with handle grips 46. The opposite end of injector rod 44 has a pointed end 44b to facilitate efficient flow of fertilizer through opening 22 and outlet 24 as well as easy penetration of the soil. An adjustable injector rod depth collar 48 is mounted on the injector rod 44 above the tubular centralizer 38 in order to fix the lowermost position to which the injector rod 44 may travel. An adjustable footpeg/ collar 50 is mounted on the injector rod 44 below the tubular centralizer 38 and above the cylindrical lower section 20c. The footpeg/ collar 50 fixes the uppermost position to which the injector rod 44 may travel, and provides a surface upon which additional downward force may be applied to the injector rod 44 to facilitate easier penetration into the soil. Near the top of the tubular centralizer 38 is a lid retainer clasp 52 to hold the lid 34 in its open position while the hopper 20 is being filled with fertilizer.

With reference now to FIGS. 4 and 5, a filtering screen 54 is located inside the hopper 20. The screen 54 rests on brackets 56 located on the inside surface of the semi-cylindrical upper section 20a of the hopper 20. The screen 54 is provided with a tab 54a to permit easy insertion and removal. The filtering screen 54 filters out large chunks of fertilizer which might otherwise clog or impede the gravitational flow of fertilizer through the opening 22 and outlet 24.

OPERATION

With reference to FIGS. 5 and 6, the operation of the fertilizer injector tool may be readily understood. After deciding upon the amount of fertilizer and therefore the depth of the hole to be punched in the soil for the particular application, the adjustable depth collar 48 is located in a position resting on the top of the tubular centralizer 38 so that the pointed lower end 44b of the injector rod 44 extends beyond the bottom end of cylindrical bottom section 20c the desired distance. The depth collar 48 is then locked in place on the injector rod 44 by means of lock screw 48a. The foot peg collar 50 is adjusted so that it will contact the bottom end of the tubular centralizer 38 just as the taper on the pointed end 44b of the injector rod 44 begins to be seen at the top of the bushing 28. The foot peg collar 50 is now locked in place on injector rod 44 by means of lock screw 50a. With these adjustments made, the injector rod 44 is lowered until the depth collar 48 bottoms out on the top of the tubular centralizer 38. In this position the injector rod 44 has closed the outlet 24 at the bottom of the cylindrical bottom section 20c of the hopper 20. The lift handle 42 is rotated to lock the injector rod 44 in this position and the fertilizer injector tool T is now ready to be filled. With the filter screen 54 in place and the lid locked in the up position, the tool T may be placed against a stationary object such as a tree trunk, wall, or side of a building and the granular fertilizer poured into the top of the hopper 20. Larger chunks of the fertilizer material which are trapped by the screen 54 may be broken up and passed through or removed.

The fertilizer injector tool T is then carried to the selected location and pointed end 44b is placed on the surface of the soil S. Holding the handle grips 46 and one foot on the foot peg 50, the user applies a downward force and the injector rod 44 is pushed into the soil until the cylindrical bottom section 20c of the hopper 20 comes to rest on or slightly below the surface of the soil S, as shown in FIG. 5.

Lift handle 42 is then loosened by backing off on thread 42b and gripped with one hand to hold the tool T stationary as the injector rod 44 is pulled upward by the other hand. The upward travel of injector rod 44 will stop as the foot peg collar 50 contacts the bottom surface of the tubular centralizer 38. After the injector rod 44 has been pulled into the full up position, its pointed end 44b clears the outlet 24 of the cylindrical bottom section 20c and the fertilizer flows through the opening 22 and out the outlet 24 filling the hole formed in the soil S, as shown in FIG. 6.

Now that the hole has been filled, the injector rod 44 is pushed downward and the hopper 20 lifted upward by the lift handle 42, thereby closing the outlet 24 as the injector rod 44 passes through and beyond the outlet 24. The lift handle 42 is then rotated to lock the threads 42b against the injector rod 44 thereby locking the injector rod 44 in the down position, blocking the flow of fertilizer remaining in the hopper 20. The fertilizer injector tool T may now be carried to another location and the above outlined procedure repeated.

While the invention has been herein shown and described in what is presently conceived to be the most practical and preferred embodiment thereof, it will be obvious to those skilled in the art that many modifications thereof may be made within the scope of the invention, which scope is to be accorded the broadest interpretation of the appended claims, so as to encompass all equivalent structures and methods.

The invention claimed is:

1. Apparatus for injecting fertilizer into the soil comprising:

a hopper for receiving fertilizer having an upper storage section and a tubular bottom section, the axis of which is offset from said upper storage section, but having an opening along one side thereof to receive fertilizer from said storage section, the lower end of said tubular bottom section having an outlet through which fertilizer may be dispersed and the upper end of said tubular section having an upper opening;

an elongated tubular centralizer affixed to said hopper but totally outside thereof, the upper and lower ends of which are opened and the axis of which coincides with the axis of said tubular bottom section of said hopper, the lower end of said centralizer being axially spaced from said upper opening of said tubular bottom section;

an injector rod slidably received in said tubular centralizer and the lower end of which is slidably disposed in said tubular bottom section of said hopper for reciprocation between an extended position, in which the lower end of said injector rod projects downwardly from said bottom tubular section for engagement with said soil but preventing flow of said fertilizer through said tubular section outlet, and a retracted position, allowing flow of fertilizer from said hopper to said soil through said tubular bottom section outlet; the upper end of said injector rod being provided with a handle by which said injector rod may be manipulated including reciprocation between said extended and retracted positions; and a footpeg member affixed to said injector rod for radial projection therefrom between the lower end of said centralizer and the upper end of said tubular bottom section.

2. Fertilizer injecting apparatus as set forth in claim 1 in which said injector rod is provided with stop means for limiting reciprocal movement of said injector rod between said extended and retracted positions.

3. Fertilizer injecting apparatus as set forth in claim 2 in which said stop means includes a collar member adjustable on said injector rod and engageable with one end of said centralizer for predetermining said extended position of said injector rod.

4. Fertilizer injecting apparatus as set forth in claim 1 in which said centralizer is provided with a handle member extending radially therefrom to aid in manipulation of said injector rod relative to said centralizer.

5. Fertilizer injecting apparatus as set forth in claim 4 in which the end of said centralizer handle member is threaded for engagement with a corresponding threaded hole through the wall of said centralizer so that upon rotation of said handle member, the end thereof may engage said injector rod for preventing relative movement between said injector rod and said centralizer.

6. Fertilizer injecting apparatus as set forth in claim 1 in which said footpeg member is axially adjustable on said injector rod and engageable with at least one of said centralizer and said tubular bottom section for predetermining at least one of said extended or retracted positions of said injector rod.

7. Fertilizer injecting apparatus set forth in claim 1 in which the lower end of said tubular hopper section is provided with a plurality of longitudinal slots and circumferentially biasing spring means to provide radial sealing pressure between the outer surface of said injector rod and the surrounding surface of said tubular section outlet.

8. Fertilizer injecting apparatus as set forth in claim 1 in which said hopper includes an intermediate transfer section between said upper storage section and said tubular bottom section, the walls of which taper downwardly and inwardly toward said tubular bottom section and at least one wall of which forms, with a wall of said upper storage section, a common longitudinal flat wall against which said centralizer is affixed substantially parallel thereto.

9. Fertilizer injecting apparatus as set forth in claim 1 in which the lower end of said injector rod is provided with a point the side of which generally faces toward said side opening of said tubular bottom section being defined by a plane surface passing through the axis of said injector rod at an inclined angle thereto, the remainder of said point being defined by the continuing longitudinal surfaces of said injector rod.

10. Apparatus for injecting fertilizer into the soil comprising:
  a hopper for receiving fertilizer having an upper storage section and a tubular bottom section, the axis of which is offset from said upper storage section, but having an opening along one side thereof to receive fertilizer from said storage section, the lower end of said tubular bottom section being provided with a plurality of longitudinal slots and having an outlet through which fertilizer may be dispersed and the upper end of said tubular section having an upper opening;
  an elongated tubular centralizer affixed to said hopper but totally outside thereof, the upper and lower ends of which are opened and the axis of which coincides with the axis of said tubular bottom section of said hopper;
  an injector rod slidably received in said tubular centralizer and the lower end of which is slidably disposed in said tubular bottom section of said hopper for reciprocation between an extended position, in which the lower end of said injector rod projects downwardly from said bottom tubular section for engagement with said soil but preventing flow of said fertilizer through said tubular section outlet, and a retracted position, allowing flow of fertilizer from said hopper to said soil through said tubular bottom section outlet; and
  circumferentially biasing spring means at said slotted lower end of said tubular bottom section providing radial sealing pressure between the outer surface of said injector rod and the surrounding surface of said tubular section outlet.

* * * * *